(12) United States Patent
Okuyama

(10) Patent No.: US 11,914,252 B2
(45) Date of Patent: Feb. 27, 2024

(54) DISPLAY DEVICE AND ARRAY SUBSTRATE FOR DISPLAY DEVICE

(71) Applicant: Japan Display Inc., Tokyo (JP)

(72) Inventor: Kentaro Okuyama, Tokyo (JP)

(73) Assignee: JAPAN DISPLAY INC., Tokyo (JP)

(*) Notice: Subject to any disclaimer, the term of this patent is extended or adjusted under 35 U.S.C. 154(b) by 0 days.

(21) Appl. No.: 17/884,600

(22) Filed: Aug. 10, 2022

(65) Prior Publication Data

US 2022/0382113 A1 Dec. 1, 2022

Related U.S. Application Data

(63) Continuation of application No. PCT/JP2020/047430, filed on Dec. 18, 2020.

(30) Foreign Application Priority Data

Feb. 14, 2020 (JP) ................................. 2020-023235

(51) Int. Cl.
*G02F 1/1362* (2006.01)
*G02F 1/1368* (2006.01)

(52) U.S. Cl.
CPC ...... *G02F 1/136209* (2013.01); *G02F 1/1368* (2013.01); *G02F 1/136286* (2013.01)

(58) Field of Classification Search
CPC .................................................... G02F 1/1362
See application file for complete search history.

(56) References Cited

U.S. PATENT DOCUMENTS

| 2006/0139526 A1* | 6/2006 | Ahn ................. G02F 1/133555 349/114 |
| 2011/0085104 A1 | 4/2011 | Arasawa et al. |
| 2011/0310340 A1 | 12/2011 | Nakamura et al. |
| 2017/0052312 A1* | 2/2017 | Jung ...................... G02B 30/33 |
| 2017/0261809 A1 | 9/2017 | Mizuno et al. |
| 2020/0127011 A1 | 4/2020 | Yamazaki et al. |
| 2021/0118909 A1* | 4/2021 | Hsieh ................ H01L 29/78633 |

(Continued)

FOREIGN PATENT DOCUMENTS

| JP | 2011-100117 A | 5/2011 |
| JP | 2012-3165 A | 1/2012 |

(Continued)

OTHER PUBLICATIONS

International Search Report and Written Opinion dated Mar. 2, 2021, received for PCT Application PCT/JP2020/047430, filed on Dec. 18, 2020, 19 pages including English Translation.

*Primary Examiner* — Sang V Nguyen

(74) *Attorney, Agent, or Firm* — XSENSUS LLP

(57) ABSTRACT

According to one embodiment, a display device includes a first substrate, a second substrate, a liquid crystal layer located between the first substrate and the second substrate and containing a polymer and a liquid crystal molecule, and a light emitting module provided along a side surface of the second transparent substrate. At least one of the first substrate and the second substrate includes first light-shielding portions arranged in a first direction. When a width of each of the first light-shielding portions in the first direction is defined as Lx, and an interval of the adjacent first light-shielding portions in the first direction is defined as Sx, a duty ratio Dx shown by Lx/(Sx+Lx) is less than or equal to 0.2.

13 Claims, 10 Drawing Sheets

(56) References Cited

U.S. PATENT DOCUMENTS

| | | | |
|---|---|---|---|
| 2021/0132433 A1* | 5/2021 | Numata | G02F 1/1335 |
| 2021/0142754 A1* | 5/2021 | Hayashi | G02F 1/136227 |
| 2021/0223465 A1* | 7/2021 | Numata | G02F 1/133317 |

FOREIGN PATENT DOCUMENTS

| | | | |
|---|---|---|---|
| JP | 2017-167214 A | 9/2017 | |
| JP | 2020-20936 A | 2/2020 | |
| WO | 2018/130920 A1 | 7/2018 | |
| WO | 2020/022112 A1 | 1/2020 | |

* cited by examiner

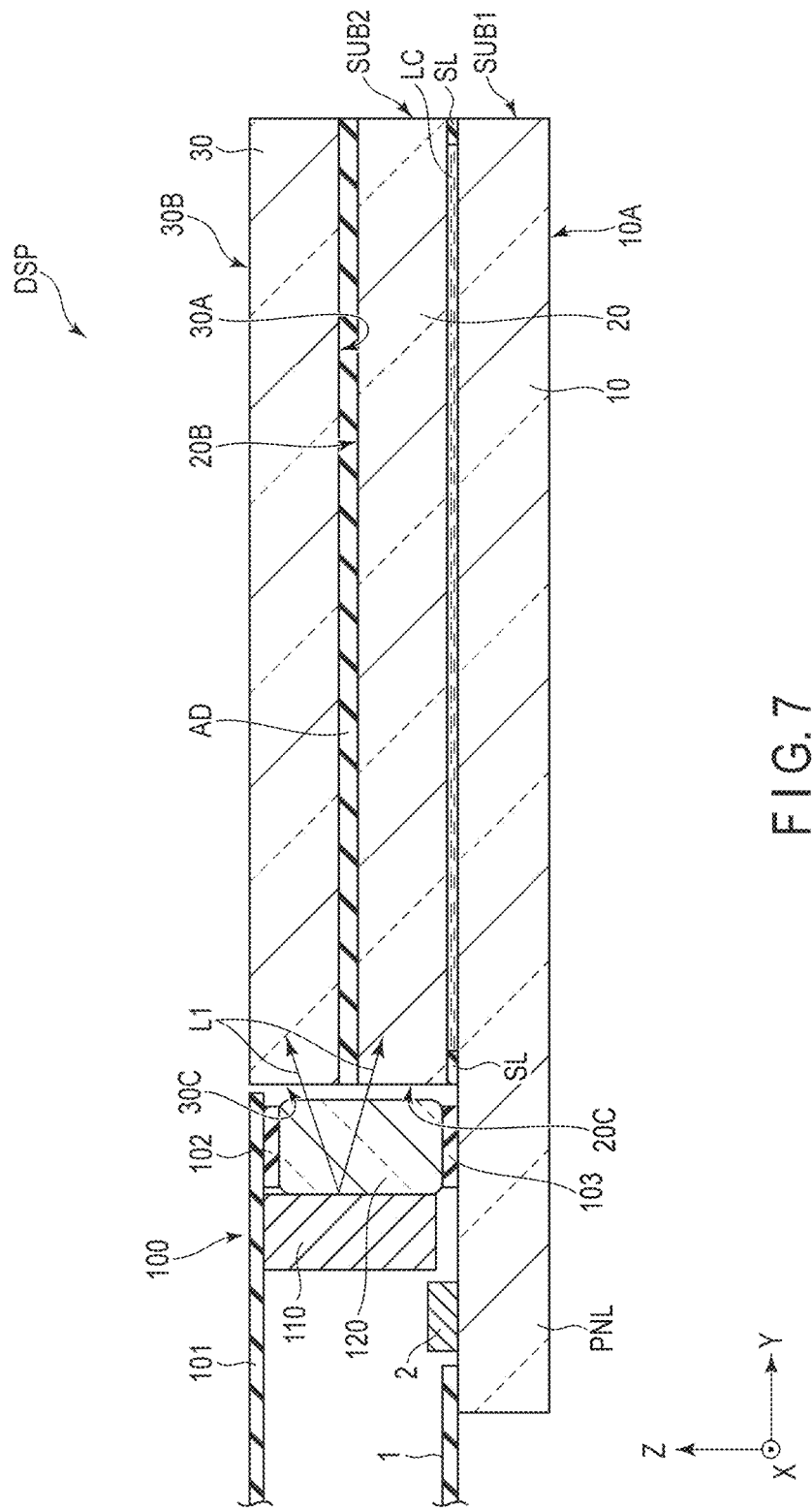
F I G. 7

| Duty ratio | Level | Evaluation |
|---|---|---|
| 0.01 | 5 | ◎ |
| 0.03 | 5 | ◎ |
| 0.07 | 4 | ○ |
| 0.1 | 4 | ○ |
| 0.15 | 4 | ○ |
| 0.2 | 4 | ○ |
| 0.25 | 3 | ○ |
| 0.3 | 2 | × |
| 0.5 | 1 | × |
| 0.95 | — | Not transmissive |

FIG. 12

| Duty ratio | Level | Evaluation |
|---|---|---|
| 0.01 | 5 | ◎ |
| 0.03 | 5 | ◎ |
| 0.07 | 5 | ◎ |
| 0.1 | 4 | ○ |
| 0.15 | 4 | ○ |
| 0.2 | 4 | ○ |
| 0.25 | 3 | ○ |
| 0.3 | 2 | × |
| 0.5 | 1 | × |
| 0.95 | — | Not transmissive |

FIG. 13

DISPLAY DEVICE AND ARRAY SUBSTRATE FOR DISPLAY DEVICE

CROSS-REFERENCE TO RELATED APPLICATIONS

This application is a Continuation Application of PCT Application No. PCT/JP2020/047430, filed Dec. 18, 2020 and based upon and claiming the benefit of priority from Japanese Patent Application No. 2020-023235, filed Feb. 14, 2020, the entire contents of all of which are incorporated herein by reference.

FIELD

Embodiments described herein relate generally to a display device and an array substrate for a display device.

BACKGROUND

In recent years, a display device using a polymer dispersed liquid crystal which can switch the state between a scattered state for scattering incident light and a transmissive state for transmitting incident light has been suggested. For example, a display device in which a reflective layer formed of aluminum, silver, etc., covers a pixel switching circuit portion has been disclosed.

BRIEF DESCRIPTION OF THE DRAWINGS

FIG. 7 is a cross-sectional view of the display device DSP including a light emitting module 100.

FIG. 12 is a diagram showing an example of the result of the subjective evaluation of the display device DSP.

FIG. 13 is a diagram showing another example of the result of the subjective evaluation of the display device DSP.

DETAILED DESCRIPTION

Figure 1:
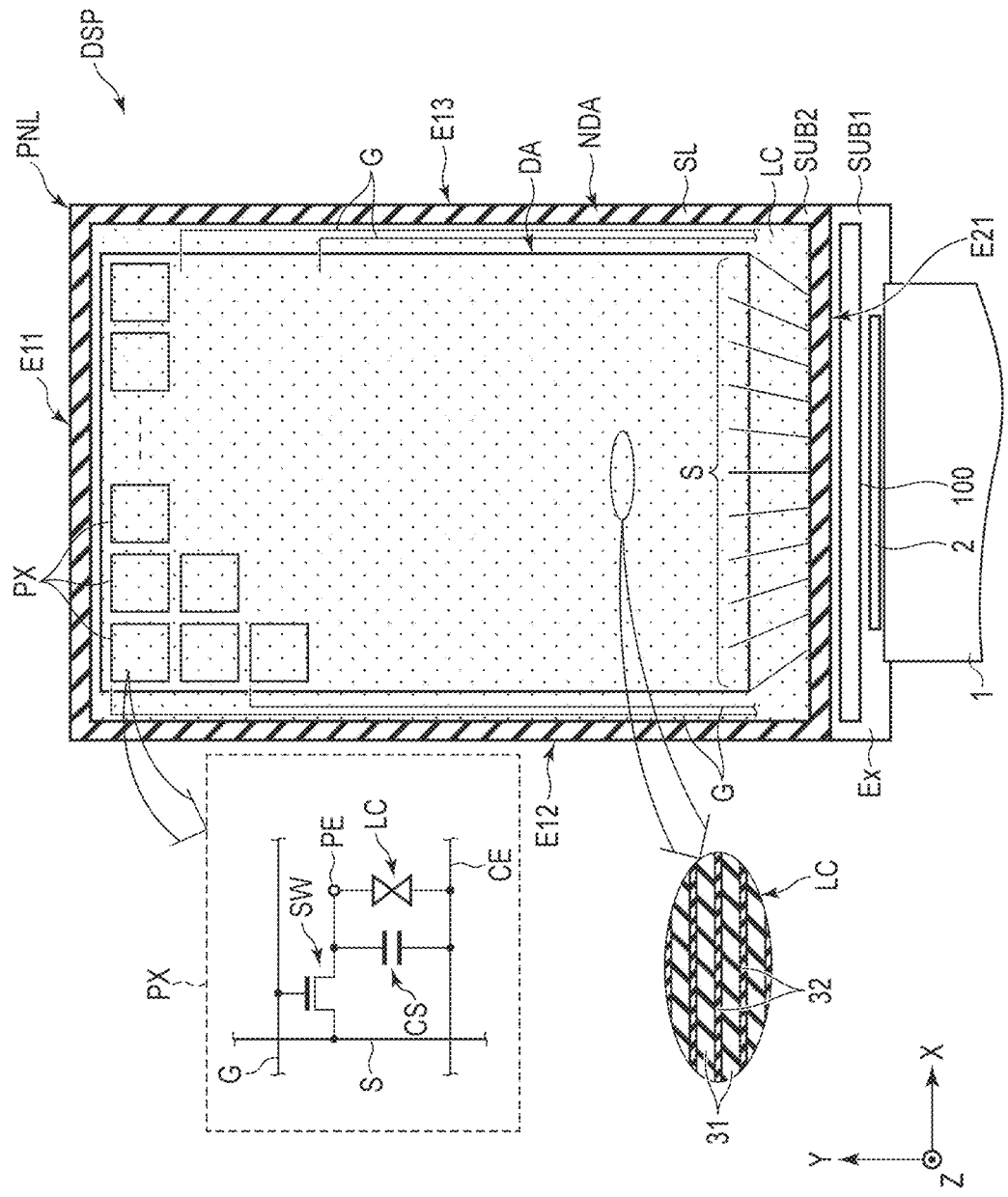
FIG. 1 is a plan view showing a configuration example of a display device DSP according to an embodiment.

The embodiments described herein aim to provide a display device and an array substrate for a display device to prevent the degradation of display quality.

In general, according to one embodiment, a display device comprises a first substrate comprising a first transparent substrate and a pixel electrode, a second substrate comprising a second transparent substrate and a common electrode, a liquid crystal layer located between the first substrate and the second substrate and containing a polymer and a liquid crystal molecule, and a light emitting module provided along a side surface of the second transparent substrate. At least one of the first substrate and the second substrate comprises first light-shielding portions arranged in a first direction. When a width of each of the first light-shielding portions in the first direction is defined as Lx, and an interval of the adjacent first light-shielding portions in the first direction is defined as Sx, a duty ratio Dx shown by $Lx/(Sx+Lx)$ is less than or equal to 0.2.

According to another embodiment, a display device comprises a first substrate comprising a first transparent substrate and a pixel electrode, a second substrate comprising a second transparent substrate and a common electrode, a liquid crystal layer located between the first substrate and the second substrate and containing a polymer and a liquid crystal molecule, and a light emitting module provided along a side surface of the second transparent substrate. At least one of the first substrate and the second substrate comprises first light-shielding portions arranged in a first direction, second light-shielding portions arranged in a second direction intersecting with the first direction, and third light-shielding portions surrounded by the first light-shielding portions and the second light-shielding portions. When a width of each of the first light-shielding portions in the first direction is defined as Lxn, and a width of each of the third light-shielding portions in the first direction is defined as Lxw, and a width of each of the third light-shielding portions in the second direction is defined as Lyw, and an interval between the first light-shielding portion and the third light-shielding portion in the first direction is defined as Sxn, and an interval between the second light-shielding portion and the third light-shielding portion in the second direction is defined as Syn, a duty ratio Dx shown by $\{Lxn/(Sxn+Lxw+Lxn)\}\times\{Syn/(Syn+Lyw)\}+\{(Lxn+Lxw)/(Sxn+Lxw+Lxn)\}\times Lyw/(Syn+Lyw)$ is less than or equal to 0.2.

According to yet another embodiment, an array substrate for a display device comprises a transparent substrate, first lines arranged in a first direction, and second lines arranged in a second direction intersecting with the first direction. When a width of each of the first lines in the first direction is defined as Lx, and an interval of the adjacent first lines in the first direction is defined as Sx, a duty ratio Dx shown by $Lx/(Sx+Lx)$ is less than or equal to 0.2.

According to yet another embodiment, an array substrate for a display device comprises a transparent substrate, first lines arranged in a first direction, second lines arranged in a second direction intersecting with the first direction, and switching elements electrically connected to the first lines and the second lines. When a width of each of the first lines in the first direction is defined as Lxn, and a width of each of the switching elements in the first direction is defined as Lxw, and a width of each of the switching elements in the second direction is defined as Lyw, and an interval between the first line and the switching element in the first direction is defined as Sxn, and an interval between the second line and the switching element in the second direction is defined as Syn, a duty ratio Dx shown by $\{Lxn/(Sxn+Lxw+Lxn)\}\times\{Syn/(Syn+Lyw)\}+\{(Lxn+Lxw)/(Sxn+Lxw+Lxn)\}\times Lyw/(Syn+Lyw)$ is less than or equal to 0.2.

The embodiments can provide a display device and an array substrate for a display device to prevent the degradation of display quality.

An embodiment will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a plan view showing a configuration example of a display device DSP according to an embodiment. For example, a first direction X, a second direction Y and a third direction Z are orthogonal to one another. However, they may intersect one another at an angle other than 90 degrees. The first direction X and the second direction Y correspond to directions parallel to the main surfaces of the substrates constituting the display device DSP. The third direction Z corresponds to the thickness direction of the display device DSP. In the present embodiment, a plan view is defined as appearance when an X-Y plane defined by the first direction X and the second direction Y is viewed.

The display device DSP comprises a display panel PNL comprising a polymer dispersed liquid crystal layer (hereinafter, simply referred to as a liquid crystal layer LC), a wiring board 1, an IC chip 2 and a light emitting module 100.

The display panel PNL comprises a first substrate SUB1, a second substrate SUB2, the liquid crystal layer LC and a sealant SL. The first substrate SUB1 overlaps the second substrate SUB2 in plan view. The first substrate SUB1 is attached to the second substrate SUB2 by the sealant SL. The liquid crystal layer LC is held between the first substrate SUB1 and the second substrate SUB2 and is sealed by the sealant SL.

As schematically shown in an enlarged view in FIG. 1, the liquid crystal layer LC contains polymers 31 and liquid crystal molecules 32. For example, the polymers 31 are liquid crystal polymers. The polymers 31 are formed in a streak shape extending in the first direction X, and are arranged in the second direction Y. The liquid crystal molecules 32 are dispersed in the gaps of the polymers 31, and are aligned such that their long axes are parallel to the first direction X. Each of the polymers 31 and the liquid crystal molecules 32 has optical anisotropy or refractive anisotropy. The responsiveness of the polymers 31 to an electric field is less than that of the liquid crystal molecules 32 to an electric field.

For example, the alignment direction of the polymers 31 hardly changes regardless of whether or not an electric field is formed. The alignment direction of the liquid crystal molecules 32 changes depending on an electric field in a state where a high voltage greater than or equal to a threshold is applied to the liquid crystal layer LC. In a state where no voltage is applied to the liquid crystal layer LC, the optical axis of the polymers 31 is parallel to that of the liquid crystal molecules 32. The light which entered the liquid crystal layer LC is hardly scattered inside the liquid crystal layer LC and passes through the liquid crystal layer LC (transparent state). In a state where voltage is applied to the liquid crystal layer LC, the optical axis of the polymers 31 intersects with that of the liquid crystal molecules 32. The light which entered the liquid crystal layer LC is scattered inside the liquid crystal layer LC (scattered state).

The display panel PNL comprises a display portion DA which displays an image, and a non-display portion NDA which surrounds the display portion DA and has a frame shape. The sealant SL is located in the non-display portion NDA. The display portion DA comprises pixels PX arranged in matrix in the first direction X and the second direction Y.

As shown in an enlarged view in FIG. 1, each pixel PX comprises a switching element SW, a pixel electrode PE, a common electrode CE, the liquid crystal layer LC, etc. The switching element SW is formed by, for example, a thin-film transistor (TFT), and is electrically connected to a scanning line G and a signal line S. The scanning line G is electrically connected to the switching elements SW of the pixels PX arranged in the first direction X. The signal line S is electrically connected to the switching elements SW of the pixels PX arranged in the second direction Y. The pixel electrode PE is electrically connected to the switching element SW. The common electrode CE is provided so as to be common to a plurality of pixel electrodes PE. The liquid crystal layer LC (especially, the liquid crystal molecules 32) is driven by an electric field generated between the pixel electrode PE and the common electrode CE. Capacitance CS is formed between, for example, an electrode having the same potential as the common electrode and an electrode having the same potential as the pixel electrode PE.

As described later, the first substrate SUB1 comprises the scanning lines G, the signal lines S, the switching elements SW and the pixel electrodes PE. The second substrate SUB2 comprises the common electrode CE. In the first substrate SUB1, the scanning lines G and the signal lines S are electrically connected to the wiring board 1 or the IC chip 2.

The wiring board 1 and the IC chip 2 are mounted on the extending portion Ex of the first substrate SUB1. The extending portion Ex corresponds to, of the first substrate SUB1, a portion which does not overlap the second substrate SUB2. The wiring board 1 is, for example, a flexible printed circuit board which can be bent. The IC chip 2 comprises, for example, a built-in display driver which outputs signals necessary for image display. The IC chip 2 may be mounted on the wiring board 1.

The light emitting module 100 is provided along a side surface (or an edge portion) of the display panel PNL, and emits light to the side surface. The light emitting module 100 may be provided along a short side of the display panel PNL, or may be provided along a long side of the display panel PNL.

In the configuration example shown in FIG. 1, the light emitting module 100 overlaps the extending portion Ex in plan view, and is provided along a side surface E21 of the display panel PNL. The light emitting module 100 may be provided along another side surface of the display panel PNL. For example, the light emitting module 100 may be provided along a side surface E11 on the opposite side of the side surface E21, or may be provided along the other side surfaces E12 and E13. The side surfaces E11 to E13 include side surfaces of the first substrate SUB1 and side surfaces of the second substrate SUB2. In this case, the light emitting module 100 may emit light to the side surface of one of the first substrate SUB1 and the second substrate SUB2, or may emit light to the side surfaces of both the first substrate SUB1 and the second substrate SUB2. It should be noted that, when the light emitting module 100 is provided along the side surface E12 or E13, the polymers 31 of the liquid crystal layer LC are formed in a streak shape extending in the second direction Y, and further, the liquid crystal molecules 32 are aligned such that their long axes are parallel to the second direction Y.

Figure 2:
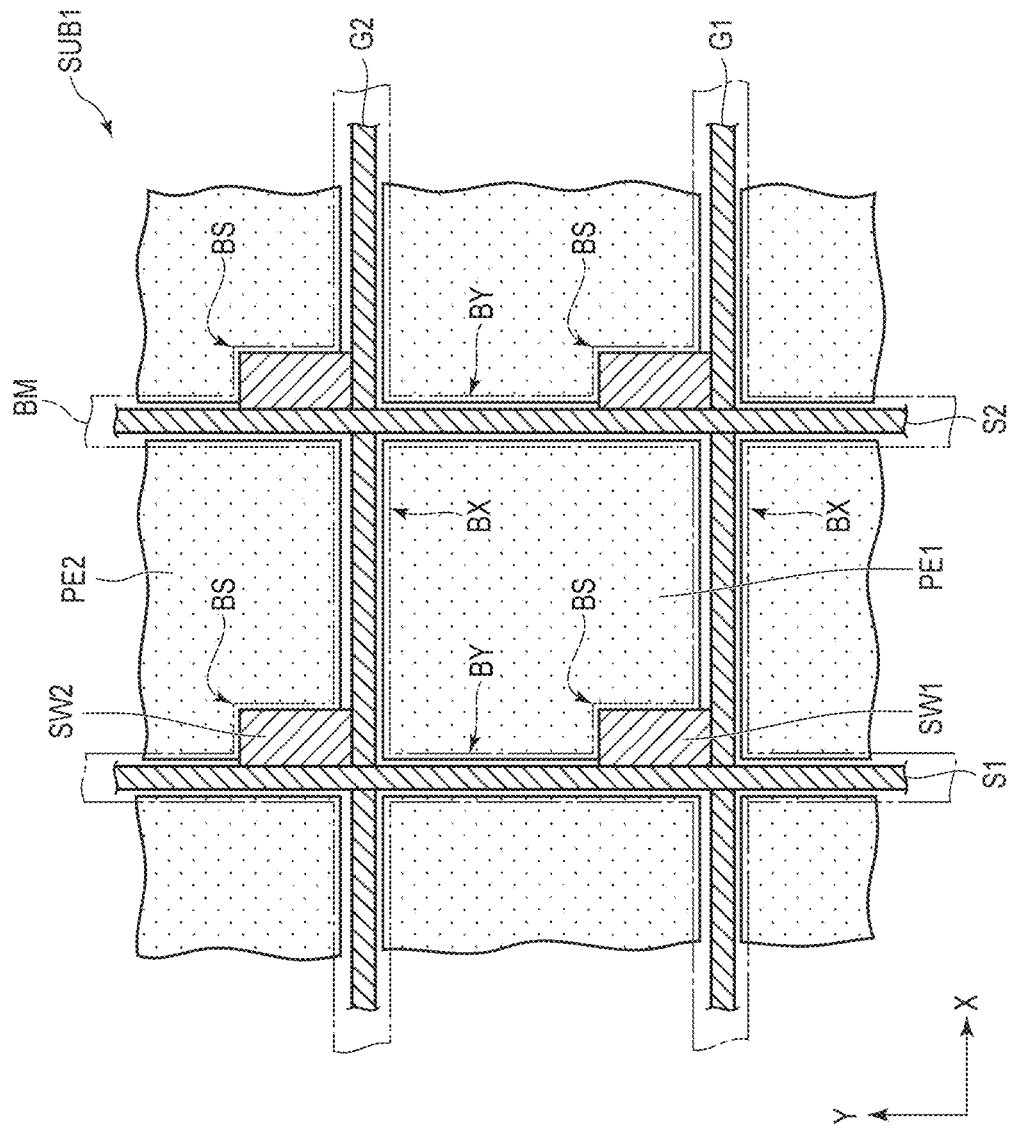
FIG. 2 is a plan view showing a configuration example of the first substrate SUB1 shown in FIG. 1.

FIG. 2 is a plan view showing a configuration example of the first substrate SUB1 shown in FIG. 1. Here, only the main portions of the first substrate SUB1 are shown. The first substrate SUB1 comprises scanning lines G1 and G2, signal lines S1 and S2, switching elements SW and pixel electrodes PE. The scanning lines G1 and G2, the signal lines S1 and S2 and the switching elements SW are formed of a light-shielding (non-transparent) conductive material.

The signal lines S1 and S2 correspond to first light-shielding portions or first lines which are arranged at an interval in the first direction X. These signal lines S1 and S2 extend in the second direction Y. The scanning lines G1 and G2 correspond to second light-shielding portions or second lines which are arranged at an interval in the second direction Y. These scanning lines G1 and G2 extend in the first direction X.

Each of the switching elements SW corresponds to a third light-shielding portion surrounded by the scanning lines G1 and G2 and the signal lines S1 and S2. For example, a switching element SW1 is electrically connected to the scanning line G1 and the signal line S1. A switching element SW2 is electrically connected to the scanning line G2 and the signal line S1.

Each of the pixel electrodes PE is surrounded by two signal lines which are adjacent to each other in the first direction X and two scanning lines which are adjacent to each other in the second direction Y, and is electrically connected to a corresponding switching element SW. For example, when this specification focuses attention on pixel electrodes PE1 and PE2 which are adjacent to each other in the second direction Y, the pixel electrode PE1 is electrically connected to the switching element SW1, and the pixel electrode PE2 is electrically connected to the switching element SW2.

The light-shielding layer BM shown by one-dot chain lines in the figure is provided in the second substrate. The light-shielding layer BM overlaps the scanning lines G1 and G2, the signal lines S1 and S2 and the switching elements SW in plan view. More specifically, the light-shielding layer BM comprises portions BX extending in the first direction X, portions BY extending in the second direction Y, and portions BS surrounded by the portions BX and the portions BY. The portions BX overlap the respective scanning lines G1 and G2, and correspond to the second light-shielding portions. The portions BY overlap the respective signal lines S1 and S2, and correspond to the first light-shielding portions. The portions BS overlap the respective switching elements SW1 and SW2, and correspond to the third light-shielding portions.

Figure 3:
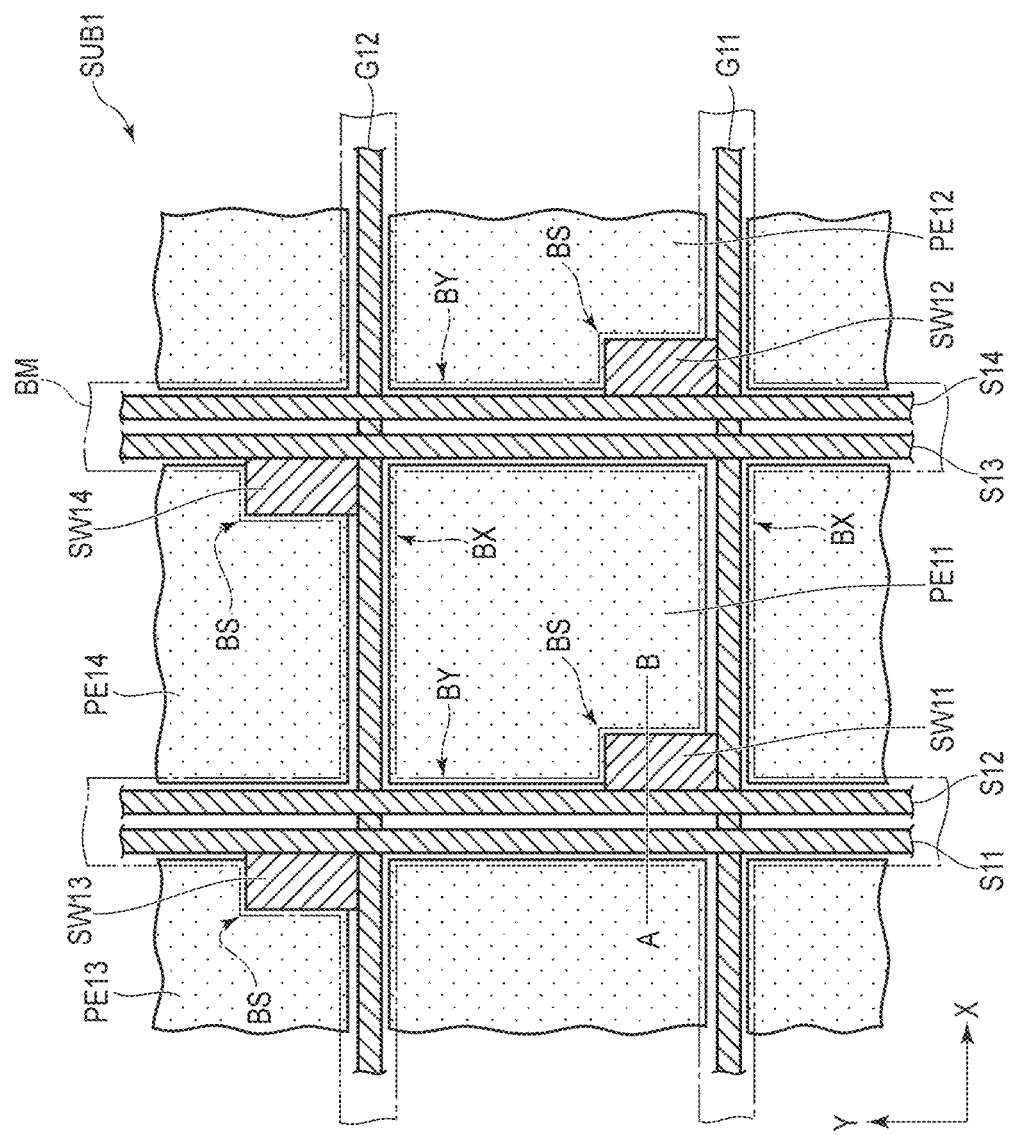
FIG. 3 is a plan view showing another configuration example of the first substrate SUB1 shown in FIG. 1.

FIG. 3 is a plan view showing another configuration example of the first substrate SUB1 shown in FIG. 1. The configuration example shown in FIG. 3 is different from the configuration example shown in FIG. 2 in respect that a plurality of signal lines are provided between pixel electrodes which are adjacent to each other in the first direction X.

The first substrate SUB1 comprises scanning lines G11 and G12, signal lines S11 to S14, switching elements SW11 to SW14 and pixel electrodes PE11 to PE14. The pixel electrodes PE11 and PE12 are adjacent to each other in the first direction X. The pixel electrodes PE13 and PE14 are adjacent to each other in the first direction X. The pixel electrodes PE11 and PE14 are adjacent to each other in the second direction Y.

The switching element SW11 is electrically connected to the scanning line G11 and the signal line S12. The pixel electrode PE11 is electrically connected to the switching element SW11. The switching element SW12 is electrically connected to the scanning line G11 and the signal line S14. The pixel electrode PE12 is electrically connected to the switching element SW12. The switching element SW13 is electrically connected to the scanning line G12 and the signal line S11. The pixel electrode PE13 is electrically connected to the switching element SW13. The switching element SW14 is electrically connected to the scanning line G12 and the signal line S13. The pixel electrode PE14 is electrically connected to the switching element SW14.

In the configuration example shown in FIG. 3, two signal lines are provided between adjacent pixel electrodes. For example, the signal lines S13 and S14 are provided between the pixel electrodes PE11 and PE12. The signal lines S11 and S12 are provided between the pixel electrodes PE13 and PE14.

In the light-shielding layer BM, a single portion BY overlaps the signal lines S11 and S12. Another portion BY overlaps the signal lines S13 and S14. The width of each portion BY shown in FIG. 3 in the first direction X is greater than the width of each portion BY shown in FIG. 2. The portions BX overlap the respective scanning lines G11 and G12. The portions BS overlap the respective switching elements SW11 to SW14.

Figure 4:
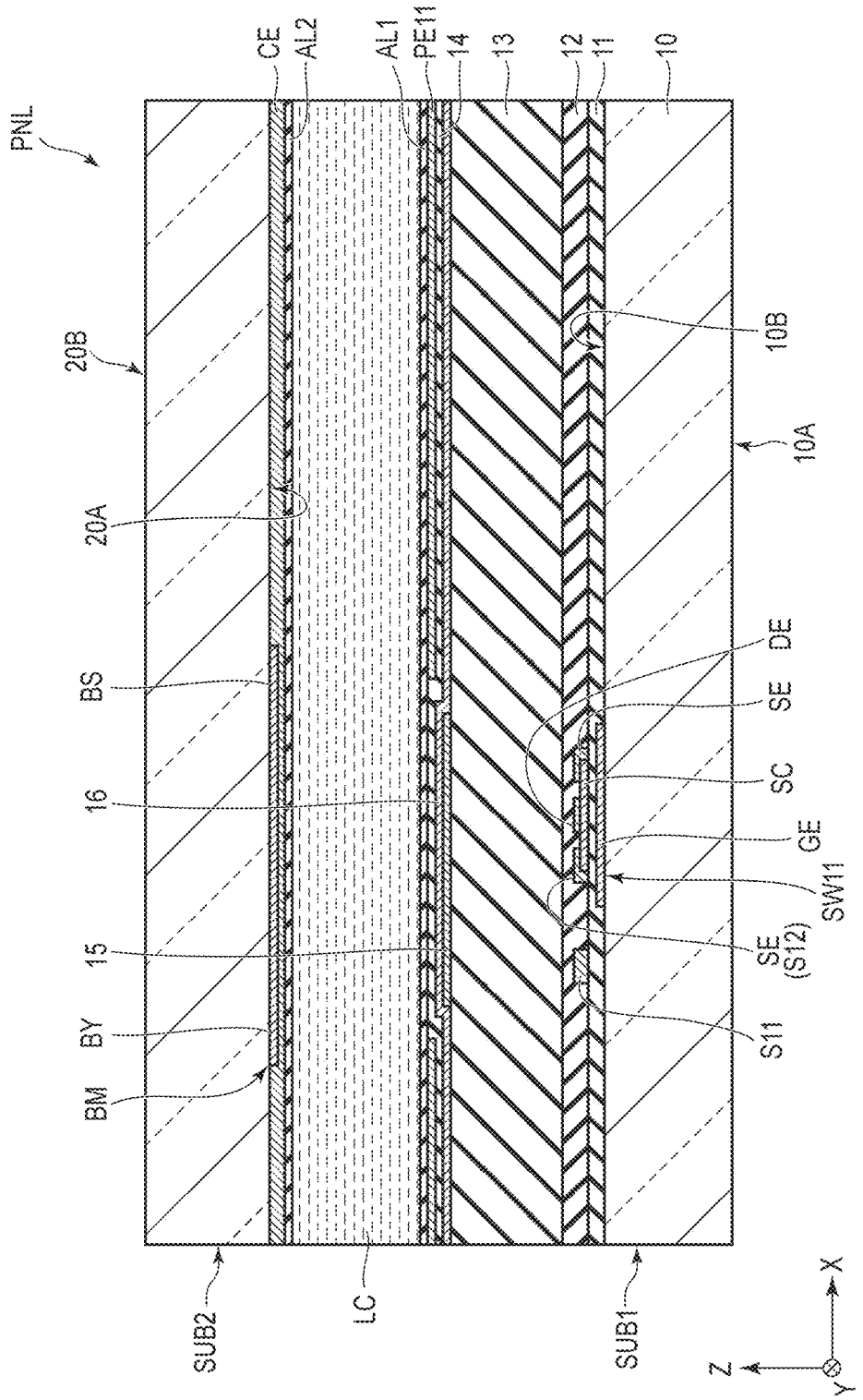
FIG. 4 is a cross-sectional view showing a configuration example of a display panel PNL along the A-B line shown in FIG. 3.

FIG. 4 is a cross-sectional view showing a configuration example of the display panel PNL along the A-B line shown in FIG. 3.

The first substrate SUB1 comprises a first transparent substrate 10, insulating films 11 to 14, a metal layer 15, a capacitive electrode 16, the switching element SW11, the pixel electrode PE11 and an alignment film AL1. The first transparent substrate 10 comprises a main surface (external surface) 10A, and a main surface (internal surface) 10B on the opposite side of the main surface 10A. The switching element SW11 is provided on the main surface 10B side. The gate electrode GE of the switching element SW11 is provided on the main surface 10B and is covered with the insulating film 11. The gate electrode GE is integrally formed with the scanning line G11 shown in FIG. 3.

The signal lines S11 and S12 and the semiconductor layer SC of the switching element SW11 are provided on the insulating film 11 and are covered with the insulating film 12. The source electrodes SE and the drain electrode DE of the switching element SW11 are in contact with the semiconductor layer SC and are covered with the insulating film 12. The source electrodes SE are integrally formed with the signal line S12. The drain electrode DE is located between a pair of source electrodes SE.

The insulating film 13 is provided on the insulating film 12. The metal layer 15 is provided on the insulating film 13. The metal layer 15 overlaps the signal lines S11 and S12 and the switching element SW11. The capacitive electrode 16 is provided on the insulating film 13, is in contact with the metal layer 15, and is covered with the insulating film 14. Thus, the capacitive electrode 16 is electrically connected to the metal layer 15. The pixel electrode PE11 is provided on the insulating film 14 and is covered with the alignment film AL1. The pixel electrode PE11 faces the capacitive electrode 16 via the insulating film 14 in the third direction Z. The alignment film AL1 is in contact with the liquid crystal layer LC.

The second substrate SUB2 comprises a second transparent substrate 20, the light-shielding layer BM, the common electrode CE and an alignment film AL2. The second transparent substrate 20 comprises a main surface (internal surface) 20A, and a main surface (external surface) 20B on the opposite side of the main surface 20A. The main surface 20A faces the main surface 10B. The light-shielding layer BM and the common electrode CE are provided in the main surface 20A. Of the light-shielding layer BM, the portion BY faces the signal lines S11 and S12 and the metal layer 15 in the third direction Z. Of the light-shielding layer BM, the portion BS faces the switching element SW11 and the metal layer 15 in the third direction Z. The common electrode CE is in contact with the light-shielding layer BM. The common electrode CE faces a plurality of pixel electrodes PE including the pixel electrode PE11 in the third direction Z. The common electrode CE is electrically connected to the capacitive electrode 16 and has the same potential as the capacitive electrode 16. The alignment film AL2 covers the common electrode CE. The alignment film AL2 is in contact with the liquid crystal layer LC.

The first transparent substrate 10 and the second transparent substrate 20 are, for example, glass substrates. However, they may be insulating substrates such as plastic substrates. The insulating films 11, 12 and 14 are inorganic insulating films. The insulating film 13 is an organic insulating film. The capacitive electrode 16, the pixel electrode PE and the common electrode CE are transparent electrodes formed of a transparent conductive material such as indium tin oxide (ITO) or indium zinc oxide (IZO). The light-shielding layer BM may be an insulating layer or may be a conductive layer having a resistance less than that of the common electrode CE. When the light-shielding layer BM is a conductive layer, the resistance of the common electrode CE is caused to be less by electrically connecting the common electrode CE to the light-shielding layer BM. The alignment films AL1 and AL2 are horizontal alignment films having alignment restriction force substantially parallel to the X-Y plane. For example, alignment treatment has been applied to the alignment films AL1 and AL2 in the first direction X. The alignment treatment may be rubbing treatment or light alignment treatment.

Figure 5:
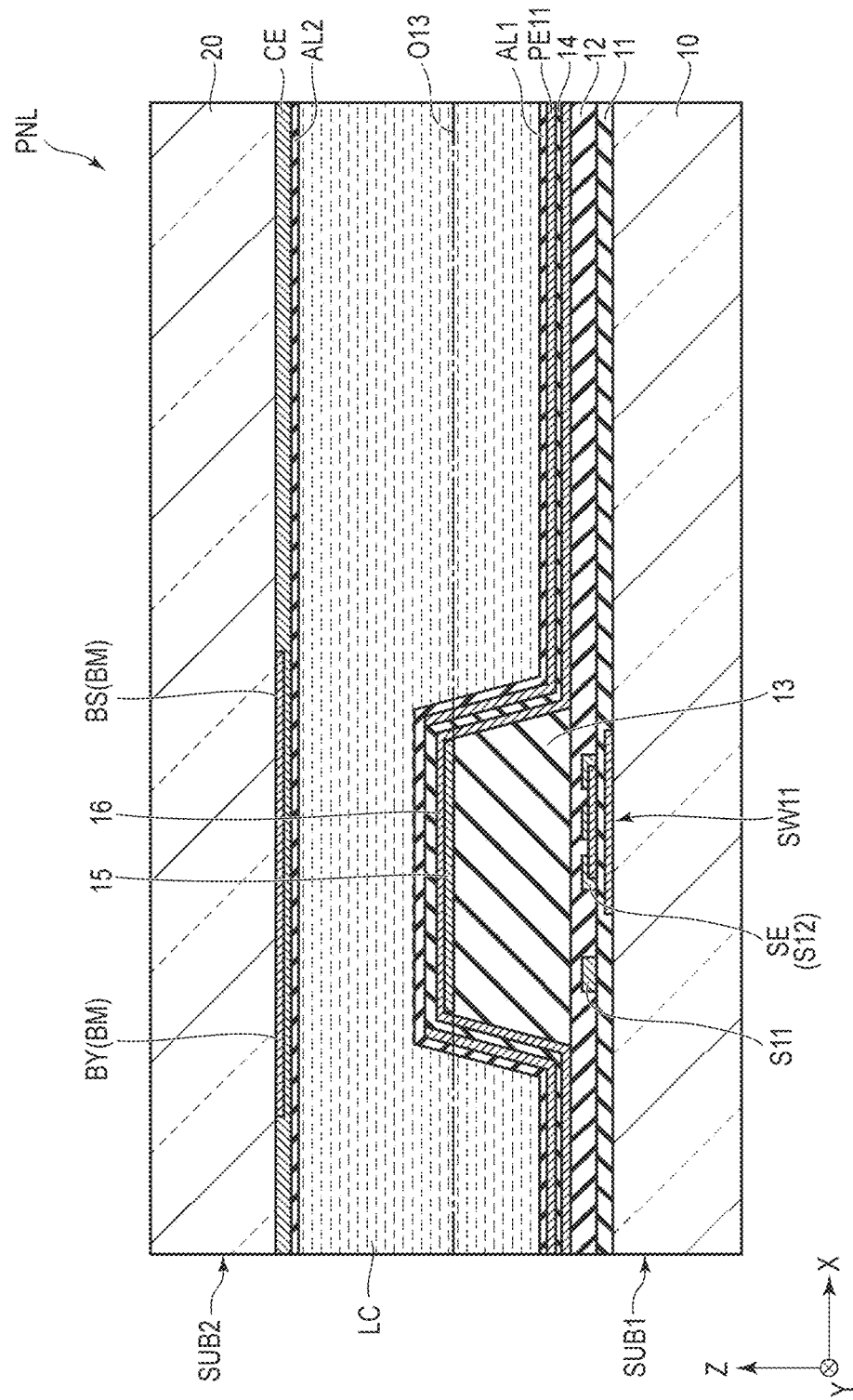
FIG. 5 is a cross-sectional view showing another configuration example of the display panel PNL along the A-B line shown in FIG. 3.

FIG. 5 is a cross-sectional view showing another configuration example of the display panel PNL along the A-B line shown in FIG. 3. The configuration example shown in FIG. 5 is different from the configuration example shown in FIG. 4 in respect that the insulating film 13 comprises an opening portion O13 overlapping the pixel electrode PE11. The insulating film 13 overlaps the signal lines S11 and S12 and the switching element SW11 and extends in the second direction Y. Although not shown in the figure, the insulating film 13 also overlaps the scanning lines and extends in the first direction X. In other words, the insulating film 13 is formed in a bathtub shape. In the configuration example shown in FIG. 5, in the opening portion O13, the insulating film 13 is completely removed and penetrated such that the insulating film 12 is exposed. However, the insulating film 13 may remain such that the film thickness is less than that of the portion immediately above the signal line S11.

The metal layer 15 is provided on the upper surface of the insulating film 13 and overlaps the signal lines S11 and S12 and the switching element SW11. The capacitive electrode 16 covers the metal layer 15 and covers the side surfaces of the insulating film 13. In the opening portion O13, the capacitive electrode 16 is provided on the insulating film 12. The insulating film 14 is interposed between the capacitive electrode 16 and the pixel electrode PE11. The light-shielding layer BM faces the insulating film 13 in the third direction Z.

In this configuration example, the volume of the insulating film 13 is less than that of a case where the insulating film 13 which is an organic insulating film does not comprise the opening portion O13. Thus, as described later, absorption of the light which propagates through the first substrate SUB1 in the insulating film 13 is prevented.

Figure 6:
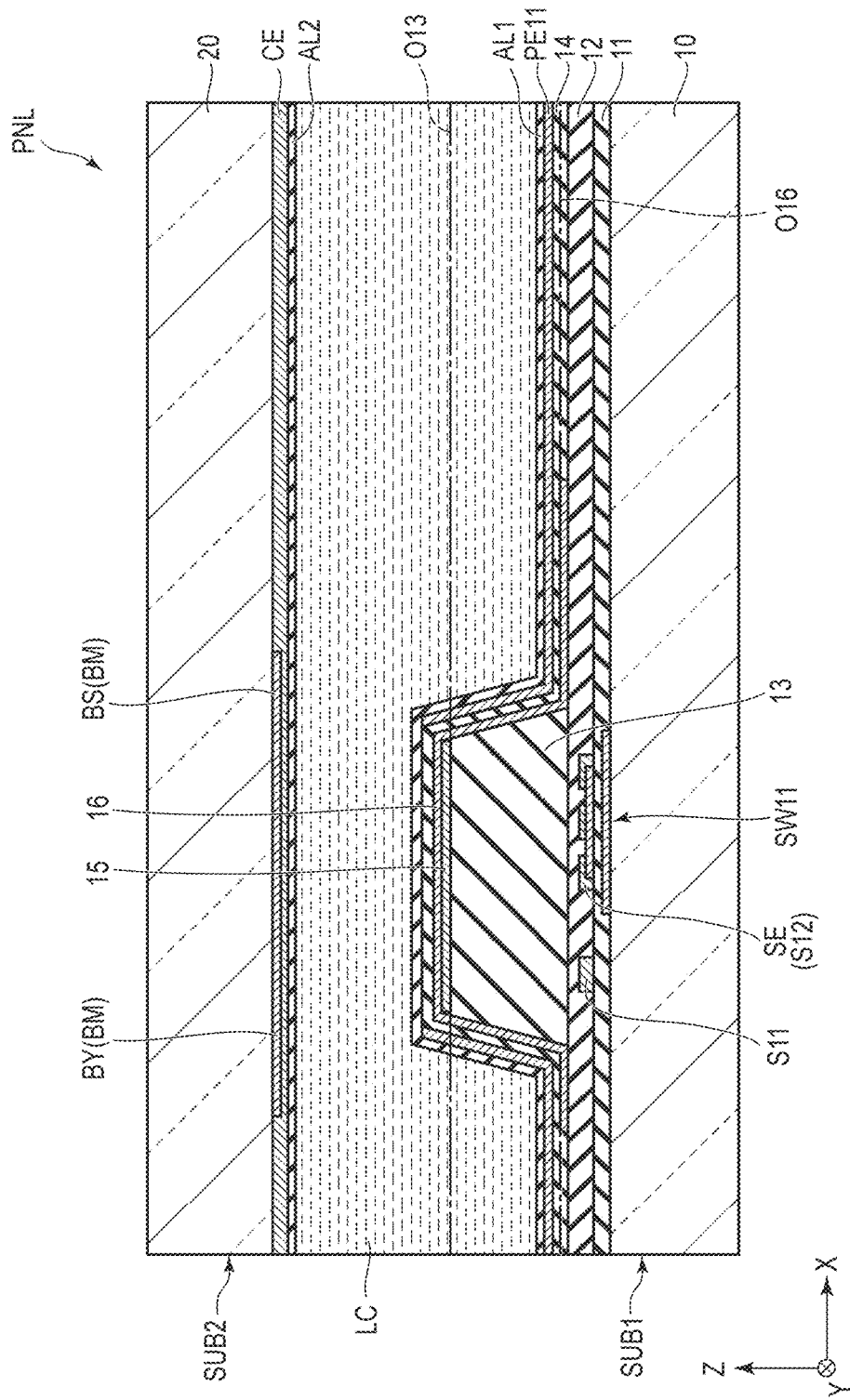
FIG. 6 is a cross-sectional view showing another configuration example of the display panel PNL along the A-B line shown in FIG. 3.

FIG. 6 is a cross-sectional view showing another configuration example of the display panel PNL along the A-B line shown in FIG. 3. The configuration example shown in FIG. 6 is different from the configuration example shown in FIG. 5 in respect that the capacitive electrode 16 comprises an opening portion O16 overlapping the pixel electrode PE11. The capacitive electrode 16 covers the metal layer 15 on the insulating film 13 and covers the side surfaces of the insulating film 13. The capacitive electrode 16 overlaps the pixel electrode PE11 via the insulating film 14 near the insulating film 13. The opening portion O16 overlaps a part of the opening portion O13. In the opening portion O16, the insulating film 14 is provided on the insulating film 12.

In this configuration example, the volume of the capacitive electrode 16 is less than that of a case where the capacitive electrode 16 does not comprise the opening portion O16. Thus, as described later, absorption of the light which propagates through the first substrate SUB1 in the capacitive electrode 16 is prevented.

FIG. 7 is a cross-sectional view of the display device DSP including the light emitting module 100. Regarding the display panel PNL, only the main portions are shown in a simplified manner.

The display device DSP further comprises a third transparent substrate 30. The third transparent substrate 30 comprises a main surface (internal surface) 30A, and a main surface (external surface) 30B on the opposite side of the main surface 30A. The main surface 30A faces the main surface 20B. The second transparent substrate 20 is attached to the third transparent substrate 30 by a transparent adhesive layer AD. The third transparent substrate 30 is, for example, a glass substrate. However, the third transparent substrate 30 may be an insulating substrate such as a plastic substrate. The third transparent substrate 30 has a refractive index equal to that of each of the first transparent substrate 10 and the second transparent substrate 20. The adhesive layer AD has a refractive index equal to that of each of the second transparent substrate 20 and the third transparent substrate 30. Here, the configuration referred to by the term "equal" is not limited to a case where the refractive index difference is zero, and includes a case where the refractive index difference is less than or equal to 0.03.

The second transparent substrate 20 comprises a side surface 20C. The third transparent substrate 30 comprises a side surface 30C. The side surface E21 of the display panel PNL shown in FIG. 1, etc., includes the side surfaces 20C and 30C. The side surface 30C is located immediately above the side surface 20C.

In the light emitting module 100, a light source 110 is provided between the first substrate SUB1 and a wiring board 101 in the third direction Z. A light guide 120 is provided between the light source 110 and the side surface 20C and between the light source 110 and the side surface 30C in the second direction Y. The light guide 120 is attached to the wiring board 101 by an adhesive layer 102 and is attached to the first substrate SUB1 by an adhesive layer 103.

Now, this specification explains light L1 emitted from the light source 110 with reference to FIG. 7. The light source 110 emits light L1 to the light guide 120. The light L1 emitted from the light source 110 propagates along the arrow of the second direction Y, passes through the light guide 120, enters the second transparent substrate 20 from the side surface 20C and enters the third transparent substrate 30 from the side surface 30C. The light L1 which entered the second transparent substrate 20 and the third transparent substrate 30 propagates through the inside of the display panel PNL while the light is repeatedly reflected. The light L1 which entered the liquid crystal layer LC to which no voltage is applied is hardly scattered and passes through the liquid crystal layer LC. The light L1 which entered the liquid crystal layer LC to which voltage is applied is scattered in the liquid crystal layer LC. The display device DSP can be viewed from the main surface 10A side and can be also viewed from the main surface 30B side. When the display device DSP is viewed from either the main surface 10A side or the main surface 30B side, the background of the display device DSP can be viewed via the display device DSP.

When a light source such as the sun or a fluorescent lamp is located in the background of the display device DSP, iridescent non-uniformity (diffraction pattern) may be observed because of the diffraction of a periodic pattern of the display panel PNL. This phenomenon is not limited to a display panel comprising a polymer dispersed liquid crystal layer, and may occur in various types of display panels having a periodic pattern (a display panel comprising a self-luminous display element such as an organic electroluminescent element, a micro LED or a mini LED, a display panel comprising a display element such as a liquid crystal element or an electrophoretic element, etc.). If a diffraction pattern overlaps the image displayed in the display portion DA, the display quality is degraded.

The inventor found that the appearance of a diffraction pattern was influenced by the duty ratio between the transmissive portion and the light-shielding portion of the display panel PNL. The inventor confirmed the following matter. When the duty ratio was less than or equal to 0.2 (20%), desirably less than or equal to 0.1 (10%), more desirably less than or equal to 0.03 (3%), a diffraction pattern did not appear or was hardly observed. This matter is hereinafter more specifically explained.

Figure 8:
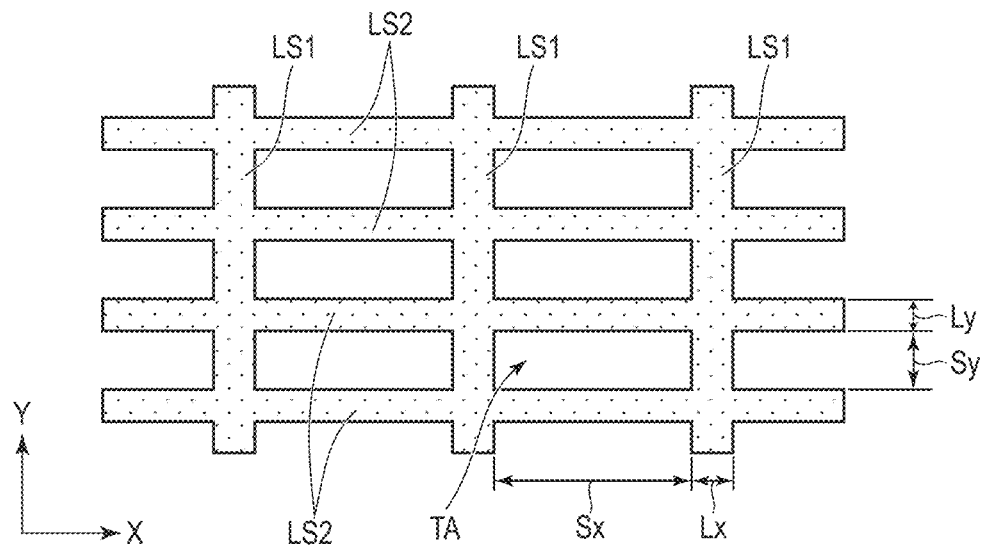
FIG. 8 is a diagram for explaining an example of the definition of a duty ratio.

FIG. 8 is a diagram for explaining an example of the definition of a duty ratio. The display panel PNL comprises a plurality of first light-shielding portions LS1 arranged in the first direction X and a plurality of second light-shielding portions LS2 arranged in the second direction Y. The first light-shielding portions LS1 are formed by the signal lines S and the portions BY of the light-shielding layer BM. The second light-shielding portions LS2 are formed by the scanning lines and the portions BX of the light-shielding layer BM. Each of the inner areas surrounded by the first light-shielding portions LS1 and the second light-shielding portions LS2 corresponds to a transmissive portion TA.

The width of each first light-shielding portion LS1 in the first direction X is defined as Lx. In the first direction X, the interval of adjacent first light-shielding portions LS1 (or the width of each transmissive portion TA) is defined as Sx. A plurality of first light-shielding portions LS1 are arranged at the equal pitches shown by (Sx+Lx). The duty ratio Dx noting the first light-shielding portions LS1 forming the longitudinal stripes in the figure is defined as follows.

$Lx/(Sx+Lx)$

The width of each second light-shielding portion LS2 in the second direction Y is defined as Ly. In the second direction Y, the interval of adjacent second light-shielding portions LS2 (or the width of each transmissive portion TA) is defined as Sy. A plurality of second light-shielding portions LS2 are arranged at the equal pitches shown by (Sy+Ly). The duty ratio Dy noting the second light-shielding portions LS2 forming the horizontal stripes in the figure is defined as follows.

$Ly/(Sy+Ly)$

The example shown in FIG. 8 assumes that the width Lx of each first light-shielding portion LS1 and the width Ly of each second light-shielding portion LS2 are substantially constant. The switching elements may be included in the first light-shielding portions LS1 or the second light-shielding portions LS2.

Figure 9:
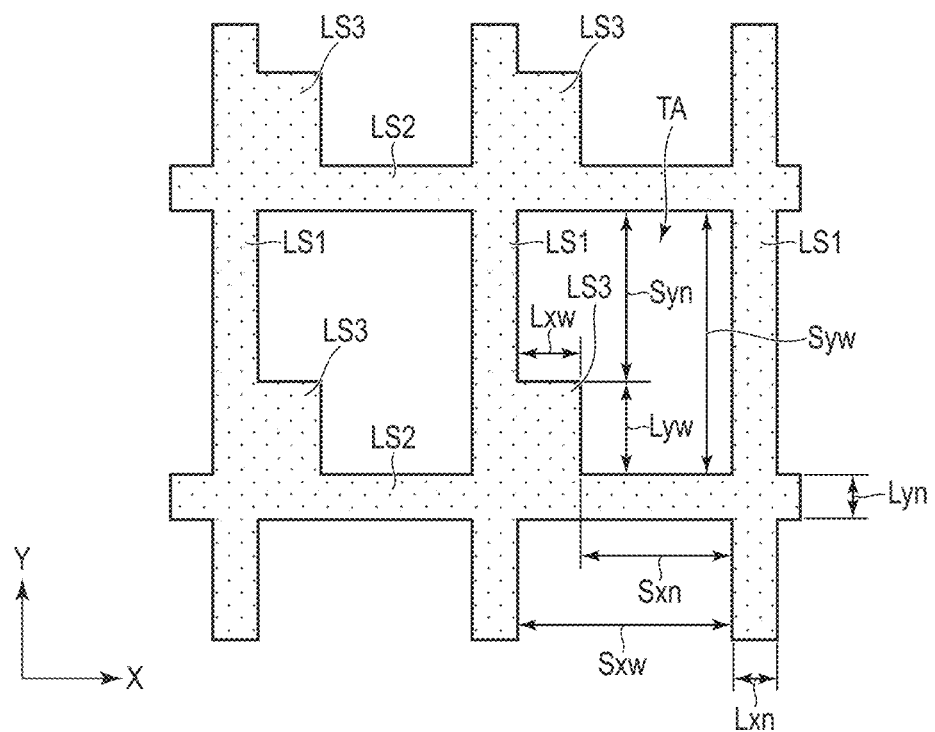
FIG. 9 is a diagram for explaining another example of the definition of a duty ratio.

FIG. 9 is a diagram for explaining another example of the definition of a duty ratio. The example shown in FIG. 9 is different from the example shown in FIG. 8 in respect that the display panel PNL comprises third light-shielding portions LS3 in addition to the first light-shielding portions LS1 and the second light-shielding portions LS2. In other words, the example shown in FIG. 9 corresponds to a case where a part of each first light-shielding portion LS1 or a part of each second light-shielding portion LS2 is extended. Thus, when the width Lx of each first light-shielding portion LS1 or the width Ly of each second light-shielding portion LS2 is not constant, the definitions of the duty ratios can be appropriately changed with reference to the example shown in FIG. 9.

The width of each first light-shielding portion LS1 in the first direction X is defined as Lxn. The width of each second light-shielding portion LS2 in the second direction Y is defined as Lyn. The width of each third light-shielding portion LS3 in the first direction X (or the width of the portion protruding from each first light-shielding portion LS1 in the first direction X) is defined as Lxw. The width of each third light-shielding portion LS3 in the second direction Y (or the width of the portion protruding from each second light-shielding portion LS2 in the second direction Y) is defined as Lyw. The interval between the first light-shielding portion LS1 and the third light-shielding portion LS3 in the first direction X is defined as Sxn. The interval between the second light-shielding portion LS2 and the third light-shielding portion LS3 in the second direction Y is defined as Syn.

The interval Sxw in the first direction X between the first light-shielding portions LS1 which are adjacent to each other in the first direction X corresponds to the sum of the width Lxw and the interval Sxn. The interval Syw in the second direction Y between the second light-shielding portions LS2 which are adjacent to each other in the second direction Y corresponds to the sum of the width Lyw and the interval Syn.

The duty ratio Dx which notes the first light-shielding portions LS1 and the third light-shielding portions LS3 forming the longitudinal stripes in the figure is defined as follows.

$\{Lxn/(Sxn+Lxw+Lxn)\}\times\{Syn/(Syn+Lyw)\}+\{(Lxn+Lxw)/(Sxn+Lxw+Lxn)\}\times Lyw/(Syn+Lyw)$ The duty ratio Dy which notes the second light-shielding portions LS2 and the third light-shielding portions LS3 forming the horizontal stripes in the figure is defined as follows.

Figure 10:
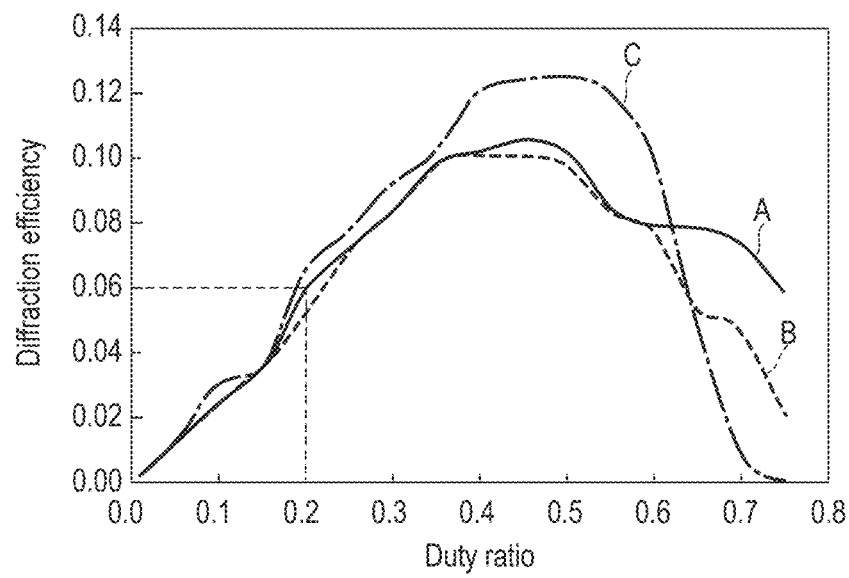
FIG. 10 is a diagram showing the result of simulation of diffraction efficiency relative to a duty ratio.

$\{Lyn/(Syn+Lyw+Lyn)\}\times\{Sxn/(Sxn+Lxw)\}+\{(Lyn+Lyw)/(Syn+Lyw+Lyn)\}\times Lxw/(Sxn+Lxw)$ FIG. 10 is a diagram showing the result of simulation of diffraction efficiency relative to a duty ratio. Here, the diffraction efficiency is defined as the ratio of the light intensity of the first diffracted light to the intensity of incident light. The display panel for the simulation is assumed to comprise only the longitudinal stipes of the first light-shielding portions LS1 shown in FIG. 8. The duty ratio Dx shown by Lx/(Sx+Lx) is applied.

In the figure, "A" corresponds to the result of simulation of a case where the width Lx is 0.5 μm. In the figure, "B" corresponds to the result of simulation of a case where the width Lx is 1 μm. In the figure, "C" corresponds to the result of simulation of a case where the width Lx is 10 μm. It should be noted that a case where the width Lx is 100 μm is also simulated, and the result of this case almost conforms to that of a case where the width Lx is 10 μm.

As the diffraction efficiency is decreased, diffracted light is more difficult to view for humans. The analysis of the inventor confirms that diffracted light is hardly viewed when the diffraction efficiency is less than or equal to 0.06. Thus, the duty ratio should be desirably less than or equal to 0.2. When the duty ratio exceeds 0.5, the area of the light-shielding portion goes beyond the area of the transmissive portion, thereby dramatically decreasing the transmittance of the display panel PNL. Thus, this duty ratio is undesirable.

The result of simulation described above is the result of the analysis of the duty ratio Dx of the longitudinal stripes of the first light-shielding portions LS1. It should be noted that the same result of simulation was obtained regarding the duty ratio Dy of the horizontal stripes of the second light-shielding portions LS2. Thus, either the duty ratio Dx or the duty ratio Dy should be desirably less than or equal to 0.2.

When both the first light-shielding portions LS1 and the second light-shielding portions LS2 exist, of the duty ratios Dx and Dy, the duty ratio which is greater than the other should be desirably less than or equal to 0.2.

Figure 11:
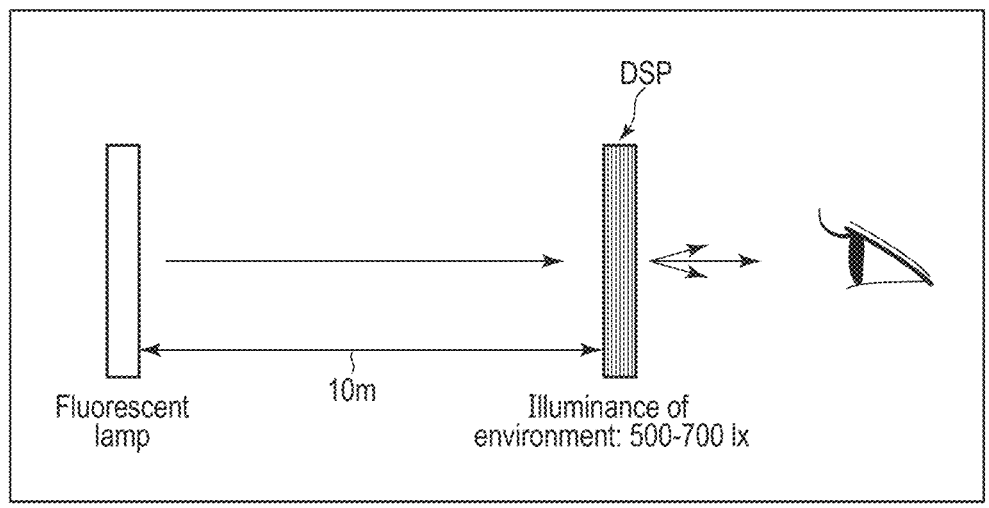
FIG. 11 is a diagram for explaining the subjective evaluation method of the display device DSP.

FIG. 11 is a diagram for explaining the subjective evaluation method of the display device DSP. The display device DSP of the sample was set in a location 10 meters distant from a fluorescent lamp. A viewer viewed the display device DSP such that the fluorescent lamp was present in the background of the display device DPS. The illuminance of the viewing environment was set to 500 to 700 lux.

Level 1 is equivalent to a level in which an iridescent unevenness is severely observed, thereby dramatically degrading the display quality of the displayed image.

Level 2 is equivalent to a level in which an iridescent unevenness is observed and interferes with the viewing when the iridescent unevenness overlaps the displayed image. Level 1 and level 2 are inappropriate levels as the display device DSP.

Level 3 is equivalent to a level in which an iridescent unevenness is slightly observed and does not interfere with the viewing even when the iridescent unevenness overlaps the displayed image. Level 3 is a level in which the display device DSP works without problems.

Level 4 is equivalent to a level in which an iridescent unevenness is slightly observed when the viewer observes the displayed image closely, and the iridescent unevenness hardly affects the image.

Level 5 is equivalent to a level in which an iridescent unevenness is not observed even when the viewer observes the displayed image closely, and the transparency is high. Level 4 and level 5 are appropriate levels as the display device DSP.

FIG. 12 is a diagram showing an example of the result of the subjective evaluation of the display device DSP. In the display device DSP of the sample, the pitch of the first light-shielding portions LS1 shown by (Sx+Lx) is 100 μm.

As shown in the figure, when the duty ratio was less than or equal to 0.25, the result of level 3 or higher was obtained. When the duty ratio was less than or equal to 0.2, the result of level 4 or higher was obtained. Further, when the duty ratio was less than or equal to 0.03, the result of level 5 was obtained. Thus, the duty ratio should be desirably less than or equal to 0.2, more desirably less than or equal to 0.03.

FIG. 13 is a diagram showing another example of the result of the subjective evaluation of the display device DSP. In the display device DSP of the sample, the pitch of the first light-shielding portions LS1 shown by (Sx+Lx) is 200 μm.

As shown in the figure, when the duty ratio was less than or equal to 0.25, the result of level 3 or higher was obtained. When the duty ratio was less than or equal to 0.2, the result of level 4 or higher was obtained. Further, when the duty ratio was less than or equal to 0.07, the result of level 5 was obtained. Thus, the duty ratio should be desirably less than or equal to 0.2, more desirably less than or equal to 0.07.

The result of evaluation described above is the result of the experiment of the duty ratio Dx of the longitudinal stripes of the first light-shielding portions LS1. It should be noted that the same result of evaluation was obtained regarding the duty ratio Dy of the horizontal stripes of the second light-shielding portions LS2. Thus, either the duty ratio Dx or the duty ratio Dy should be desirably less than or equal to 0.2, more desirably less than or equal to 0.03.

When both the first light-shielding portions LS1 and the second light-shielding portions LS2 exist, of the duty ratios Dx and Dy, the duty ratio which is greater than the other should be desirably less than or equal to 0.2.

As explained above, the present embodiment can provide a display device and an array substrate for a display device to prevent the degradation of display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
 a first substrate comprising a first transparent substrate and a pixel electrode;
 a second substrate comprising a second transparent substrate and a common electrode;
 a third transparent substrate attached to the second transparent substrate;
 a liquid crystal layer located between the first substrate and the second substrate and containing a polymer and a liquid crystal molecule; and
 a light emitting module comprising a light source, a light guide and a wiring board, wherein
 the light source is provided between the first substrate and the wiring board,
 the light guide is provided between the light source and a side surface of the second transparent substrate, and between the light source and a side surface of the third transparent substrate,
 at least one of the first substrate and the second substrate comprises first light-shielding portions arranged in a first direction, and
 when a width of each of the first light-shielding portions in the first direction is defined as Lx, and an interval of the adjacent first light-shielding portions in the first direction is defined as Sx, a duty ratio Dx shown by Lx/(Sx+Lx) is less than or equal to 0.03.

2. The display device of claim 1, wherein
at least one of the first substrate and the second substrate comprises second light-shielding portions arranged in a second direction intersecting with the first direction, and
when a width of each of the second light-shielding portions in the second direction is defined as Ly, and an interval of the adjacent second light-shielding portions in the second direction is defined as Sy, a duty ratio Dy shown by Ly/(Sy+Ly) is less than or equal to 0.03.

3. The display device of claim 2, wherein
the first substrate comprises signal lines as the first light-shielding portions and scanning lines as the second light-shielding portions, and
the second substrate comprises light-shielding layers as the first light-shielding portions and the second light-shielding portions.

4. The display device of claim 3, wherein
one of the light-shielding layers extending in the second direction overlaps the signal lines.

5. The display device of claim 4, wherein
the first substrate further comprises an organic insulating film overlapping the signal lines, and
the organic insulating film comprises an opening portion overlapping the pixel electrode.

6. The display device of claim 5, wherein
the first substrate further comprises a metal layer provided on an upper surface of the organic insulating film, and
the metal layer overlaps the signal lines.

7. The display device of claim 6, wherein
the first substrate further comprises a capacitive electrode which is in contact with the metal layer, and an inorganic insulating film interposed between the capacitive electrode and the pixel electrode.

8. The display device of claim 7, wherein
the capacitive electrode comprises an opening portion overlapping the pixel electrode.

9. A display device comprising:
a first substrate comprising a first transparent substrate and a pixel electrode;
a second substrate comprising a second transparent substrate and a common electrode;
a third transparent substrate attached to the second transparent substrate;
a liquid crystal layer located between the first substrate and the second substrate and containing a polymer and a liquid crystal molecule; and
a light emitting module comprising a light source, a light guide and a wiring board, wherein
the light source is provided between the first substrate and the wiring board,
the light guide is provided between the light source and a side surface of the second transparent substrate, and between the light source and a side surface of the third transparent substrate,
at least one of the first substrate and the second substrate comprises first light-shielding portions arranged in a first direction, second light-shielding portions arranged in a second direction intersecting with the first direction, and third light-shielding portions surrounded by the first light-shielding portions and the second light-shielding portions, and
when a width of each of the first light-shielding portions in the first direction is defined as Lxn, a width of each of the third light-shielding portions in the first direction is defined as Lxw, a width of each of the third light-shielding portions in the second direction is defined as Lyw, an interval between the first light-shielding portion and the third light-shielding portion in the first direction is defined as Sxn, and an interval between the second light-shielding portion and the third light-shielding portion in the second direction is defined as Syn,
a duty ratio Dx shown by $\{Lxn/(Sxn+Lxw+Lxn)\}\times\{Syn/(Syn+Lyw)\}+\{(Lxn+Lxw)/(Sxn+Lxw+Lxn)\}\times Lyw/(Syn+Lyw)$ is less than or equal to 0.03.

10. The display device of claim 9, wherein
when a width of each of the second light-shielding portions in the second direction is defined as Lyn,
a duty ratio Dy shown by $\{Lyn/(Sxn+Lxw+Lxn)\}\times\{Sxn/(Syn+Lyw)\}+\{(Lyn+Lyw)/(Syn+Lyw+Lyn)\}\times Lxw/(Sxn+Lxw)$ is less than or equal to 0.03.

11. The display device of claim 10, wherein
the first substrate comprises signal lines as the first light-shielding portions, scanning lines as the second light-shielding portions, and switching elements as the third light-shielding portions, and
the second substrate comprises a light-shielding layer as the first to third light-shielding portions.

12. The display device of claim 1, wherein the light guide is attached to the first substrate and the wiring board.

13. The display device of claim 9, wherein the light guide is attached to the first substrate and the wiring board.

* * * * *